United States Patent [19]

Tsaveras et al.

[11] Patent Number: 4,838,183
[45] Date of Patent: Jun. 13, 1989

[54] APPARATUS AND METHOD FOR INCINERATING HETEROGENEOUS MATERIALS

[75] Inventors: Thomas Tsaveras, Elmont; Matthew J. Gaskin, Williston Park; John T. Maidhof, Massapequa, all of N.Y.

[73] Assignee: Morse Boulger, Inc., Flushing, N.Y.

[21] Appl. No.: 154,880

[22] Filed: Feb. 11, 1988

[51] Int. Cl.⁴ ............................................. F23H 5/02
[52] U.S. Cl. ................... 110/190; 110/101 C; 110/101 CF; 110/103; 110/258; 122/2; 236/14
[58] Field of Search ............... 110/185, 186, 190, 281, 110/282, 258, 101 C, 101 CF, 103, 255, 188; 236/15 BB, 14; 122/2

[56] References Cited

U.S. PATENT DOCUMENTS

| | | | |
|---|---|---|---|
| 4,315,468 | 2/1982 | Tyer et al. | 110/190 X |
| 4,495,872 | 1/1985 | Shigari | 110/190 |
| 4,724,775 | 2/1988 | May | 110/186 |

FOREIGN PATENT DOCUMENTS

| | | | |
|---|---|---|---|
| 56-42011 | 4/1981 | Japan | 110/190 |
| 56-68714 | 6/1981 | Japan | 110/190 |

Primary Examiner—Edward G. Favors
Attorney, Agent, or Firm—Lalos & Keegan

[57] ABSTRACT

An apparatus for burning waste refuse having a heterogeneous composition comprising means defining a combustion chamber having an inlet for charging waste refuse therein and an outlet for discharging combustion gases therefrom, means disposed within the combustion chamber for agitating waste refuse charged therein, means for sensing the temperature differential of combustion gases emanating from the burning waste refuse disposed on the agitating means, between spaced points along the path of flow of the emanating combustion gases, and means responsive to variations of the sensed temperature differential relative to a preselected temperature differential for adjusting the operation of the agitating means.

74 Claims, 4 Drawing Sheets

APPARATUS AND METHOD FOR INCINERATING HETEROGENEOUS MATERIALS

This invention relates to the incineration of heterogeneous materials for disposal and energy recovery purposes, and more particularly to an improved apparatus and method for incinerating heterogeneous materials such as waste refuse which provides for efficient reduction of the material when burned for disposal purposes and optimum recovery of energy when incinerated for energy recovery purposes.

In the incineration of heterogeneous materials such as waste refuse for disposal purposes, typically there is provided an incinerator having a combustion chamber provided with an inlet for charging refuse into the combustion chamber and an outlet for discharging combustion gases emanating from the combustion chamber, and a stoker disposed in the combustion chamber for receiving refuse through the combustion chamber inlet, agitating the refuse as it is burned on the stoker and discharging residue therefrom. Examples of such stokers are illustrated and described in U.S. Pat. Nos. 3,413,938, 3,585,947 and 4,103,627, assigned to Morse Boulger, Inc. of Flushing, N.Y.

In the operation of such incinerators, it has been found that less than optimum operating conditions can result in such adverse effects as incomplete combustion of the refuse, excessive throughput time of the refuse, excessive particulate carryover in the combustion gases, excessive heating of the refractory walls of the combustion chamber and of exposed grates of the stoker, and slagging of chamber walls. In seeking to provide optimum operating conditions and at least partially to avoid such adverse effects, it has been the practice in the prior art to attempt to provide steady state conditions in the combustion process by feeding refuse into and through the combustion chamber at a steady rate and attempting to maintain the temperature of the combustion chamber in the preferred range of 1450° F. to 1600° F. The feed rate of the burning refuse typically has been controlled by controlling the speed of the reciprocating grates of the stoker and the temperature of the combustion chamber has been controlled by controlling the ratio of underfire and overfire air supplied to the burning refuse. A typical municipal type of refuse disposal system utilizing an overfire/underfire control system is illustrated and described in U.S. Pat. No. 3,552,335, also assigned to Morse Boulger, Inc.

In the incineration of refuse for energy recovery purposes, an incinerator or furnace of the type described typically is used in conjunction with a boiler having a set of steam generating tubes and a set of superheater tubes disposed in heat transfer relation with the combustion gases emanating from the combustion chamber of the incinerator, and economizer tubes disposed in the flue of the system. The steam output of the boiler is fed to a turbine of a turbine-generator set to convert the thermal energy released by the burning refuse into electrical energy in the conventional manner.

In the use of steam driven turbines for producing electrical energy, it is critical that a constant, steady flow of super heated steam be supplied to the turbine. Variations in the feed rate or quality of steam supplied to a turbine can have damaging effects on the operation and integrity of the turbine. The life of turbine-generator equipment is prolonged by steady state conditions which minimize such turbine effects as thermal differential, variable operating temperatures and steam condensation at points within the turbine particularly in the latter blade stages of the turbine. In electrical utility plants, a constant and steady flow of steam can be provided simply by adjusting the feed of fuel to the boiler furnace. This is possible because of the homogeneous quality of the fuel used to generate steam, namely coal, oil and gas. The use of waste refuse as a fuel for generating steam for driving a turbine, however, presents a more difficult task of providing a constant and steady flow of heat energy due to the heterogeneous composition of waste refuse.

Waste refuse is diverse in nature with respect to density, moisture content and heat value. It may consist of loose materials having large, exposed surface areas or dense and compact objects such as tree trunks and bundled newspapers. It can be completely dry or very wet. It may consist of materials having high heat values or low heat values. Its heat value can vary substantially although the average heat value of municipal waste refuse has been found to be in the range of 4,500–6,000 btu/lb.

The effective release of heat energy from waste refuse depends on a number of factors including the temperature of the combustion chamber, the retention time of the refuse in the combustion chamber, the amount of agitation or turbulence to which the refuse is subjected during incineration and the amount of oxygen supplied to the burning refuse. Variations in not only the density, moisture content and heat value of the refuse but also in burning conditions results in an unsteady release of thermal energy which correspondingly results in an unsteady output of a steam generating boiler.

According to the present invention, it has been found that steady state conditions in an incinerator and steady state energy generation in an energy recovery system, utilizing waste refuse as a fuel, can be achieved by controlling the position of the flame of burning refuse and hence the burning mass on the stoker of the heat generating unit. Optimum and steady state conditions can be achieved by positioning the flame in the center of the stoker where it generates optimal radiant and convective thermal energy. In conventional stokers having reciprocating grates, there usually is provided an upper feed section onto which raw refuse is charged and permitted to dry, an intermediate combustion section in which the major portion of the burning process occurs, and a lower burnout section in which the residue of the burned waste is allowed to burnout and cool. It is in the intermediate, combustion section of the stoker at which the flame of the burning refuse is best positioned to provide optimal and steady state burning conditions.

In the course of a typical incineration process, and assuming constant air flow, unless the stoker is actuated at the appropriate speed, the flame of the burning refuse will move upwardly into the feed section of the stoker, and the fire will die down in the lower sections as the burning is reduced by a lack of fuel, or downwardly into the burnout section due to excessive fuel where it will result in less complete combustion.

The positioning of the flame can be controlled by controlling the operation of the stoker. If the flame tends to move up along the length of the stoker to the feed section thereof, the flame can be moved downwardly into the combustion section by increasing the speed of reciprocation of the grates in the feed section of the stoker and possibly the grates of the combustion section. If the flame is too far down along the length of the stoker, the flame can be moved upwardly into the combustion section by decreasing the speed of reciprocation of the grates of the combustion section of the stoker and possibly the grates of the feed section also. Adjusting the position of the flame to maintain it in the intermediate or combustion section of the stoker, however, requires constant monitoring of the position of the flame and then operating appropriate drive mechanisms of the stoker to move the flame in the desired direction in response to sensed position data.

It further has been found that the position of the flame on the stoker can be determined by monitoring the differential in temperature at points along the path of flow of combustion gases emanating from burning refuse on the stoker, flowing through the combustion chamber and discharged through the flue of the unit. The precise points of temperature measurement to provide the desired temperature differential, and the selected temperature differential, will depend on the size and configuration of the combustion chamber. In incinerators used only for waste disposal purposes, preferably, the temperature is sensed in the combustion chamber where the sensor receives maximum radiant and convective thermal energy and in the combustion chamber outlet where the sensor receives less radiant energy due to shielding and heat losses. In incinerators or furnaces used for energy recovery purposes, preferably, the temperature is sensed in the combustion chamber where the sensor receives maximum radiant and convective thermal energy and in the boiler inlet where the sensor receives less radiant energy due to shielding and heat losses.

In sensing temperature differential for determining the location of the flame of burning refuse on the stoker, the setpoint of the temperature differential, i.e, $T_1 - T_2$ is established when the flame is in the intermediate o combustion section of the stoker. If the flame moves up the stoker into the feed section of the stoker, the temperature differential will increase above the setpoint. If the flame moves downwardly along the length of the stoker into the burnout section, the temperature differential will decrease below the setpoint. Accordingly, variations of the temperature differential relative to the setpoint differential are indicative of the position of the flame. Assuming the sensed temperature differential is above the setpoint, indicating the flame is too far up along the length of the stoker, the control system of the unit would be operated to correspondingly actuate the drive mechanism of the stoker to increase the speed of reciprocation of the grates of the feed section to cause the flame to move downwardly on the stoker. Conversely, if the sensed temperature differential is below the setpoint, indicating the flame is too far down on the stoker, the control system of the unit would be operated to correspondingly actuate the drive mechanism of the stoker to decrease the speed of reciprocation of the grates of the feed section to cause the flame to move upwardly along the length of the stoker.

Further in accordance with the present invention, setpoint $T_1$ and differential setpoint $T_1 - T_2$ may be adjusted to further alter operating conditions. In energy recovery applications utilizing a boiler to generate steam, setpoint $T_1$ may be adjusted in response to variations in boiler output. Such an adjustment would result in the more rapid change in combustion conditions and furnace energy output. Adjustment of differential setpoint $T_1 - T_2$ allows the flame of the burning refuse on the stoker to be repositioned in response to variations in fuel quality and variations in boiler output, i.e., energy demand.

Accordingly, it is the principal object of the present invention to provide an improved apparatus and method for incinerating materials of heterogeneous composition.

Another object of the present invention is to provide an improved apparatus and method for incinerating materials of variable density, moisture content and heat value.

A further object of the present invention is to provide an improved apparatus and method for incinerating waste refuse.

A still further object of the present invention is to provide an improved apparatus and method for incinerating heterogeneous materials such as waste refuse for disposal purposes.

Another object of the present invention is to provide an improved apparatus and method for incinerating a heterogeneous material such as waste refuse for energy recovery purposes.

A further object of the present invention is to provide an improved apparatus and method for incinerating a heterogeneous material such as waste refuse for disposal purposes in which steady state conditions in the incineration process is achieved.

A still further object of the present invention is to provide an improved apparatus and method for incinerating a heterogeneous material such as waste refuse for energy recovery purposes in which steady state energy generation is achieved.

Another object of the present invention is to provide an improved apparatus and method for incinerating a heterogeneous material such as waste refuse in which the incineration process may be closely controlled.

A further object of the present invention is to provide an improved apparatus for incinerating a heterogeneous material such as waste refuse for disposal or energy recovery purposes which is simple in design, reliable in operation and effective in performance.

Other objects and advantages of the present invention will become more apparent to those persons having ordinary skill in the art to which the present invention pertains from the following description taken in conjunction with the accompanying drawings wherein.

Figure 1:
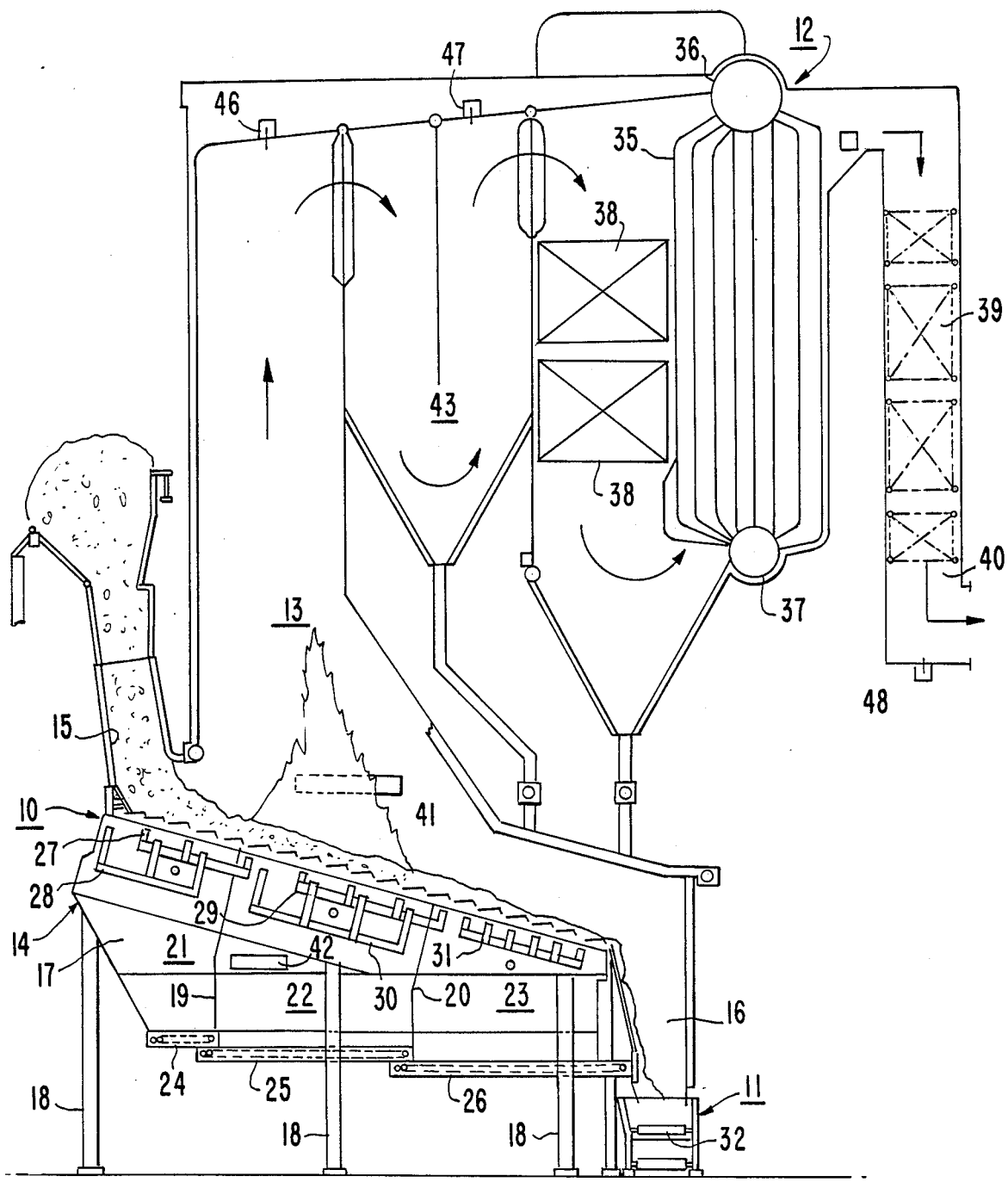
FIG. 1 is a vertical cross-section view of a system for incinerating a heterogeneous material such as waste refuse and recovering energy therefrom, embodying the present invention.
Figure 2:
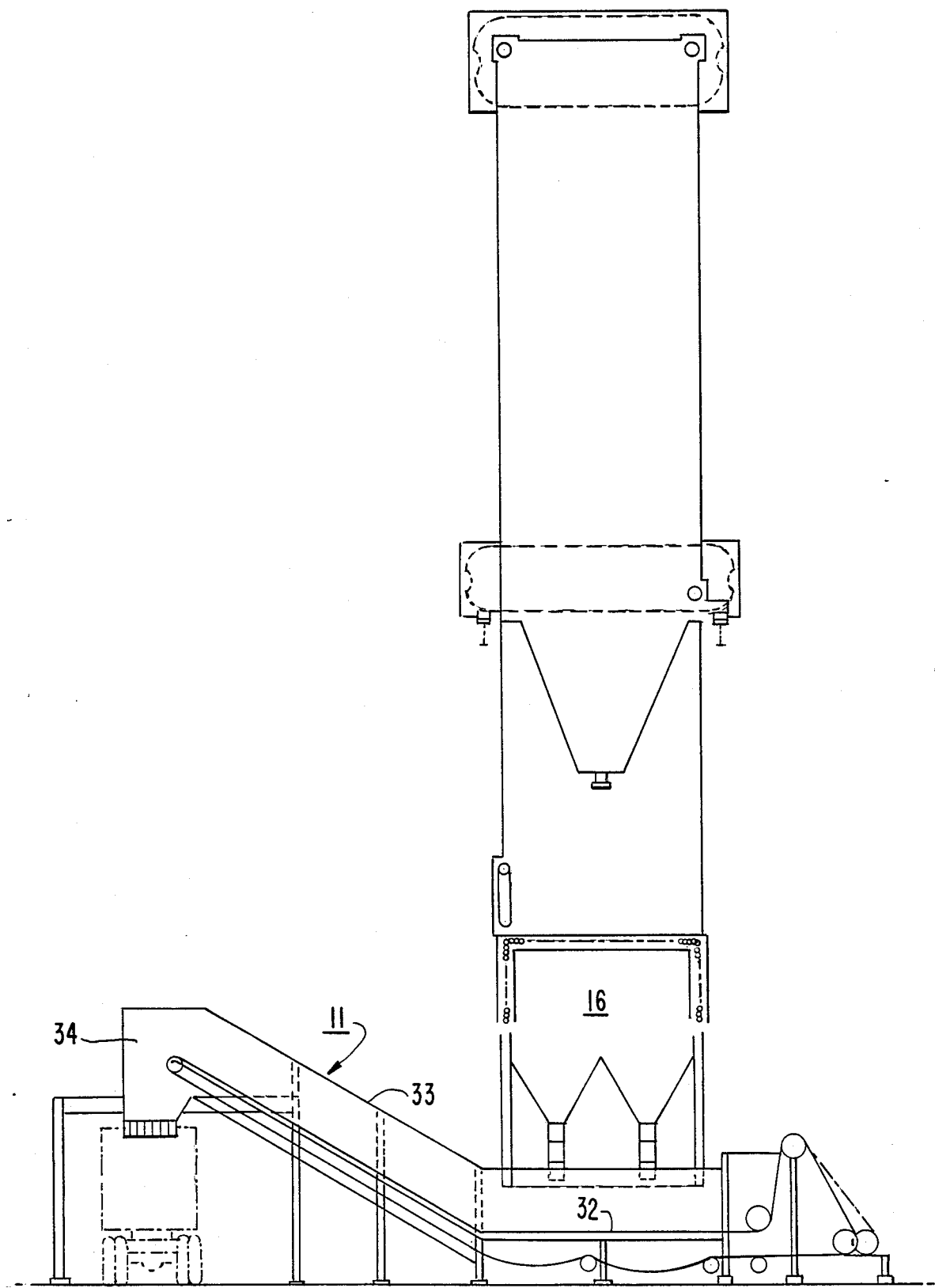
FIG. 2 is a side view of the system shown in FIG. 1.
Figure 3:
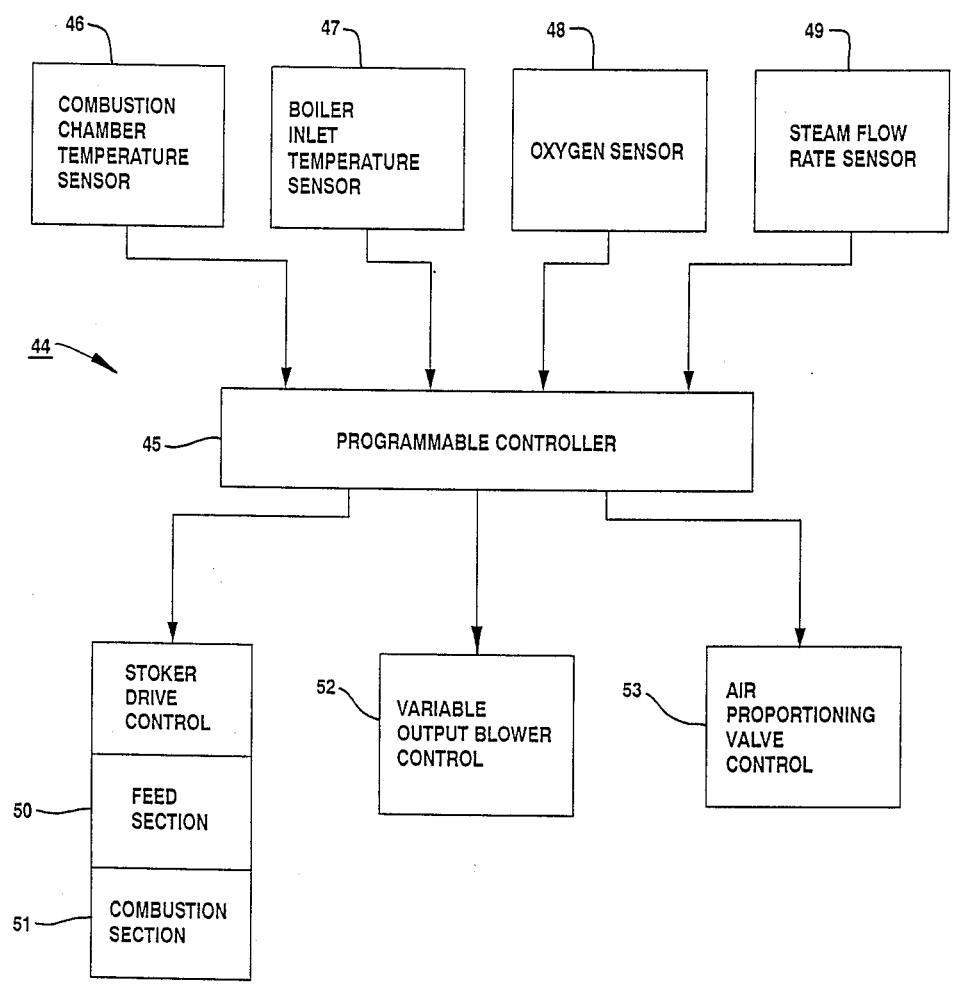
FIG. 3 is a block diagram of the control system for the system shown in FIGS. 1 and 2.

The energy recovery system shown in FIGS. 1 through 3 includes a waste refuse incinerator or furnace lo, a residue removal system 11 and a steam generating boiler unit 12. As best shown in FIG. 1, the incinerator includes a set of walls lined with refractory material. Disposed within the combustion chamber is a stoker 14 which is adapted to receive raw waste refuse at an upper end thereof through a feed chute 15, and discharge residue of burned refuse into a residue discharge chute 16. The stoker is provided with a housing structure section 17 supported on a plurality of structural members 18. The housing structure has a pair of spaced walls 19 and 20 providing compartments 21, 22 and 23 of the stoker. The lower ends of the compartments are closed by sifting removal conveyors 24, 25 and 26. The upper end of the housing structure is provided with a plurality of longitudinally spaced, transversely disposed stationary sets of the grates. Disposed on the upper end of compartment 21 of the housing structure is a pair of reciprocable carriages 27 and 28 each of which supports a plurality of longitudinally spaced, transversely disposed sets of grates, each disposed within sets of stationary grates. Similarly disposed in the upper end of compartment 22 of the housing structure is a pair of reciprocable carriages 29 and 30 each of which supports a plurality of longitudinally spaced, transversely disposed sets of grates, each disposed between sets of stationary sets of grates. Disposed in the upper end of compartment 23 is a reciprocable carriage 31 supporting a set of longitudinally spaced, transversely disposed sets of grates, each disposed between sets of stationary grates. In operation, carriages 27 through 31 are reciprocated to correspondingly reciprocate the various sets of movable grates disposed between sets of stationary grates supported on housing structure 17 to agitate refuse deposited on the stoker during the incineration process. Carriages 27 and 28, carriages 29 and 30 and carriage 31 are provided with independently operable drive mechanisms. Such mechanisms essentially include fluid actuated drives and appropriate linkages for reciprocating the carriages. Stoker 14 is illustrated and described in more specific detail in copending U.S. patent application, Ser. No. 134,812, entitled Stoker Construction, filed on Dec. 18, 1987, which is incorporated herein by reference.

As best shown in FIG. 2, residue removal system 11 includes an endless conveyor 32 disposed in a housing structure 33, which is adapted to receive residue of burned refuse from stoker 14 and convey such residue to a truck loading chute 34.

Steam generating boiler 12 is of a conventional construction and includes a set of steam generating tubes 35 interconnecting and upper steam drum 36 and a lower mud drum 37, sets of superheater tubes 38 disposed ahead of the steam generating tubes and sets of economizer tubes 39 disposed in the flue 40 of the system.

In the operation of the system as described, waste refuse is fed through combustion chamber inlet 15 onto the upper end of stoker 14. Reciprocation of carriages 27 through 31 will cause the refuse on the stoker to move along the length of the stoker as it is agitated. Burners in the chamber walls ignite and maintain the combustion of the refuse as it traverses the length of the stoker. Combustion air is supplied to the combustion chamber through ducts 41 and 42 provided in the side walls of the combustion chamber and stoker. Overfire air is supplied through duct 41 in a chamber wall above the stoker grates and underfire air is supplied through duct 42 disposed below the stoker grates. The underfire air duct communicates with compartment 22 of the stoker housing structure.

Functionally, the grates of the stoker are divided into three sections, an upper feed section disposed above compartment 21 and reciprocated by carriages 27 and 28, an intermediate or combustion section disposed above compartment 22 and reciprocated by carriages 29 and 30, and a lower or burnout section 31 disposed above compartment 23 and reciprocated by carriage 31. Ideally, refuse deposited on the upper feed section of the stoker is dried by the heat in the combustion chamber. As the grates in the upper feed section are reciprocated, the dried refuse will advance downwardly on the stoker onto the intermediate combustion section where it is ignited and burned. As the grates in the combustion section are reciprocated, the burning refuse will be agitated to enhance the burning process and will be advanced to the burnout section. In the burnout section, the grates are reciprocated at a lower speed to allow the refuse residue to burn out and be advanced and discharged into residue discharge chute 16 onto conveyor 32.

Heated combustion gases emanating from the burning refuse on the stoker are caused to rise in combustion chamber 13 flow through settling chamber 43 and boiler 12 and discharge through flue 40. In doing so, the heated combustion gases pass in heat exchange relation with superheater tubes 38, steam generating tubes 35 and economizer tubes 39 in the conventional manner. Steam generated from superheater tubes 38 is conducted to a steam turbine of a steam-generator set to drive the turbine and generate electrical power. To avoid thermal differentials, variable operating temperatures and steam condensation at points within the turbine, particularly in the latter blade stages of the turbine, it is critical that the steam output rate of the boiler be constant and steady. To provide a constant and steady steam output rate of the boiler, it is critical that the thermal energy input to the boiler be constant and steady. This may be achieved only by a constant and steady release of thermal energy by the burning of refuse in the incinerator.

To provide a constant and steady release of thermal energy by the incinerator sufficient to generate a quantity and quality of steam to drive the turbine, it is necessary to input sufficient refuse into the incinerator having a sufficient heat value to release the required thermal energy, maintain the combustion chamber at a temperature in the range of 1450° F. to 1650° F. to effect the release of the thermal energy of the refuse and to maintain the flame of the burning refuse in the combustion section of the stoker in order to provide the release of optimal radiant and convective thermal energy. The impairment of any one of such conditions will have an adverse effect on the generation of sufficient thermal energy to provide the quantity and quality of steam required to effectively and efficiently drive the turbine for the generation of electrical power. If refuse of an insufficient heat value is fed into the incinerator, there will be an insufficient amount of thermal energy available in the first instance. If the temperature of the combustion chamber is insufficient to completely and effectively incinerate the refuse, there will be an insufficient release of thermal energy. If the flame of the burning refuse moves upwardly into the feed section of the stoker or downwardly into the burnout section, other than an optimal release of thermal energy is likely to result.

Referring to FIG. 3, there is shown diagrammatically a system 44 for controlling the incineration process and thus providing a steady state energy generation of the unit shown in FIGS. 1 and 2. The system includes a programmable controller 45, a sensor 46 for measuring the temperature of the combustion chamber, a sensor 47 for measuring the temperature of the boiler inlet, a sensor 48 for measuring the oxygen content of the combustion gases discharged through the flue and a sensor 49 for measuring the steam flow rate of the boiler. Sensor 46 is mounted in the upper wall of combustion chamber 13 at a point where it would be subjected to radiant and convective thermal energy generated by the flame of burning refuse on the stoker. Sensor 47 is mounted on the upper wall of settling chamber 43 adjacent the inlet of boiler 12 so that it may be subjected to convective energy of combustion gases flowing through the settling chamber into the boiler. Sensors 46 and 47 may consist of conventional thermocouples. Oxygen sensor 48 is mounted in flue 40 downstream of economizer tubes 39 in order to measure the oxygen content of combustion gases discharged through the flue. It may consist of a conventional oxygen analyzer. Sensor 49 is mounted at the boiler outlet or in the main steam line leading from the boiler to the steam turbine. Each of sensors 46 through 49 are adapted to transmit data to controller 45 which is adapted to digitize and process input data in the conventional manner in accordance with a predetermined program. The controller may consist of a Model No. 300 controller manufactured by the Love Controls Corporation of Wheeling, Illinois, utilizing an Allen-Bradley Model SLC-100 Microprocessor. The controller is operable to process data inputted from sensors 46 through 49 and transmit command signals for operating controls 50 and 51 of the drive mechanisms for the feed and combustion sections of the stoker, the control 52 of a variable output blower which supplies total air to the combustion chamber through overfire and underfire outlets 41 and 42 and control 53 for an air proportioning valve which controls the ratio of the overfire and underfire air supplied to the combustion chamber through outlets 41 and 42. Feed section control drive 50 is adapted to control the speed of reciprocation of carriages 27 and 28 and combustion section drive control 51 is adapted to control the speed of reciprocation of carriages 29 and 30.

Figure 4:
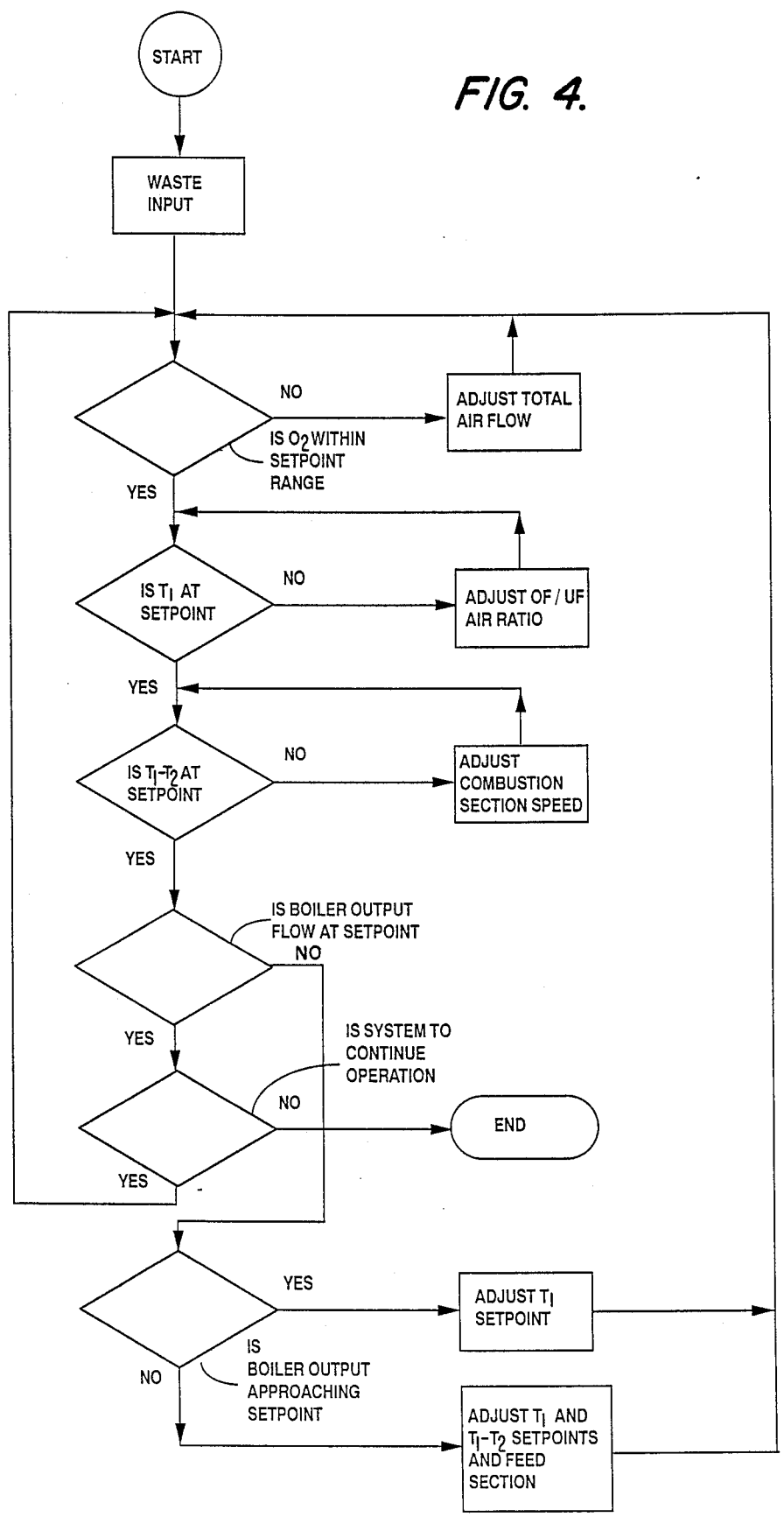
FIG. 4 is a logic diagram illustrating the sequence of operation of the programmable controller utilized in the control system shown in FIG. 3.

Controller 45 operates in a manner as illustrated in the logic diagram shown in FIG. 4 where the setpoint of $O_2$ is a selected range of the oxygen content of the combustion gases discharged through the flue, $T_1$ is a selected value of temperature of the combustion chamber and $T_2$ is a selected value of temperature of the settling chamber adjacent the boiler input. The controller first determines whether the oxygen content of the combustion gases discharged through the flue as measured by sensor 48 is within the setpoint range. If the oxygen content is not within the setpoint range, a command signal is transmitted to variable output blower control 52 to adjust the blower and correspondingly adjust the volume of total air supplied to the combustion chamber through outlets 41 and 42. If the oxygen content is within the setpoint range, the controller then determines whether $T_1$ is at the setpoint temperature. If not, the controller then transmits a signal to air proportioning valve control 53 which functions to adjust the overfire and underfire air ratio of the total air supplied to the combustion chamber through outlets 41 and 42. If $T_1$ is at setpoint, the controller then determines whether the temperature differential $T_1 - T_2$ is at setpoint. If the temperature differential is not at setpoint, the controller will transmit a command signal to drive control 51 to adjust the speed of carriages 29 and 30 in the combustion section of the stoker.

Assuming it is determined that the temperature differential is at setpoint, the controller next determines whether the steam output rate as measured by sensor 49 is at setpoint. If not, the controller then determines whether the steam output rate is approaching setpoint. If the steam output rate is approaching setpoint, the controller merely adjusts the $T_1$ setpoint. If not, the controller adjusts the $T_1$ temperature setpoint, the $T_1 - T_2$ temperature differential setpoint and transmits a command signal to feed section drive control 50 to adjust the speed of reciprocation of carriages 27 and 28 of the feed section of the stoker.

As the controller makes each of the aforementioned determinations, a reiteration of the process occurs until the programmed conditions are satisfied which results in a steady state energy generation of the unit. Preferably, the aforementioned routines are performed sequentially by the controller. Priorities may be assigned and time delays may be employed. As an example, if it is determined that the steam output rate is below the setpoint and is not approaching the setpoint, the $T_1$ temperature setpoint may be adjusted first in that such an adjustment would provide the most rapid response for increasing the generation of energy. Following a time delay, if the adjustment of the $T_1$ setpoint is insufficient in generating sufficient steam to attain the steam output rate setpoint, the temperature differential setpoint can be adjusted. Finally, following another time interval, the waste input may be adjusted to attain or maintain the setpoint value.

The controller will operate instantaneously to satisfy the demands of the system in terms of steam output. For a rising demand, the controller will increase the $T_1$ temperature setpoint, decrease temperature differential $T_1 - T_2$ and increase the waste input. As demand is met, the controller will decrease the $T_1$ temperature setpoint, steady the $T_1 - T_2$ temperature differential and steady the waste input. As higher demand is exceeded, the controller will function to decrease the $T_1$ temperature setpoint, increase the $T_1 - T_2$ pressure differential setpoint and decrease the waste input. As the demand for steam decreases, the controller will operate to decrease the $T_1$ temperature setpoint, increase the $T_1 - T_2$ temperature differential and decrease the waste input. As lower demand is met, the controller will function to increase the $T_1$ temperature setpoint, steady the $T_1 - T_2$ temperature differential and steady the waste input. Finally, as lower demand is undershot, the controller will increase the $T_1$ temperature setpoint, decrease the $T_1 - T_2$ temperature differential and increase the waste input.

Assuming the setpoint for the steam output rate was set at 50,000 lb/hr and the size and configuration of the unit provided for setpoints of 1650° F. for $T_1$ and 1400° F. for $T_2$, as long as such setpoints were satisfied in the operation of the unit, steady state conditions would be achieved. Such steady state conditions would assume the flame of the burning refuse to be positioned at the combustion section of the stoker to generate optimal radiant and convective thermal energy sensed by sensors 46 and 47. The factors which would cause a departure or deviation from such steady state conditions would be various combinations of the density, moisture content and heat value of the refuse fed onto the incinerator and burned. The release of lower heat values will first be sensed by sensor 46 and $T_1$ will fall below the 1650° F. setpoint. Under such circumstances, the controller will function to adjust the ratio of overfire and underfire air to promote greater combustion and thus raise the temperature of the emanating combustion gases to the setpoint temperature. If the flame moves upwardly or downwardly on the stoker, such movement will be sensed by an increase or decrease in the 250° F. temperature differential. If the flame moves upwardly on the stoker, the temperature differential will increase above the setpoint differential to perhaps 300° F. Under such circumstances the controller will function to adjust the combustion section speed by reducing the speed of reciprocation of carriages 29 and 30. If the flame moves downwardly on the stoker, such movement will be detected by a decrease in the temperature differential perhaps in the order of 200° F. Under these circumstances, the controller will function to adjust the speed of the combustion section of the stoker by decreasing the speed of the reciprocation of carriages 29 and 30 to cause the flame to move upwardly to the combustion section of the stoker. In addition, if the steam output rate of the boiler falls below the setpoint rate, the controller will function sequentially with appropriate time delays to adjust the $T_1$ temperature setpoint upwardly, perhaps to 1700° F., adjust the $T_1-T_2$ temperature differential setpoint by increasing it, perhaps to 300° F., and adjust the speed of reciprocation of carriages 27 and 28 in the feed section of the stoker to increase the volume of refuse fed into the incinerator. Similarly, if the steam output rate falls below the setpoint rate of 50,000 lb/hr, the controller will function sequentially with adequate time delays to adjust the $T_1$ temperature setpoint downwardly, perhaps to 1600 F., adjust the $T_1-T_2$ temperature differential setpoint downwardly to perhaps 200° F. and adjust the speed of reciprocation of carriages 27 and 28 in the feed section of the stoker to decrease the rate of feed of refuse into the incinerator. Finally, simultaneously or sequentially with the other adjustments, the controller will function to adjust the total air supplied to the furnace in response to the oxygen content of the combustion gases discharged through the flue as sensed by oxygen sensor 48. If the oxygen content of the gases is above the setpoint value, the controller will function to increase the total supply of air supplied to the combustion chamber. If the oxygen content is below the setpoint, the controller will function to decrease the total amount of air supplied to the combustion chamber.

The present invention is applicable in both maintaining steady state conditions in a waste refuse incinerator and maintaining steady state energy generation in an energy recovery system utilizing waste refuse as a fuel. In the incinerator application, the operation will be the same as previously described in connection with an energy recovery system with the exception that adjustments would not be made responsive to energy generation. The temperatures $T_1$ and $T_2$ would be measured in the combustion chamber and the combustion chamber outlet, respectively, and deviations relative to the oxygen content setpoint, the $T_1$ temperature setpoint and the $T_1-T_2$ temperature differential setpoint would be made as described in connection with adjustments in the energy recovery system.

The temperature differential of the combustion gases emanating from the burning refuse on the stoker not only functions to indicate the position of the flame of the burning refuse but also the related span of the flame along the length of the stoker. If the flame is centered at the combustion section of the stoker and the span of the flame is contained within the combustion section, the velocity of the combustion gases, say at 30,000 cfm, will result in the temperature differential setpoint of say 200° F. If the flame moves up the stoker, the span of the flame will become smaller. Correspondingly, the flow velocity of the combustion gases will decrease to perhaps 25,000 cfm and the temperature differential will increase to say 215° F. If the flame moves down the stoker, the span of the flame will become greater. Correspondingly, the flow velocity of the combustion gases will increase to perhaps 35,000 cfm and the temperature differential will decrease to say 185° F. The flow velocity and temperature values mentioned are cited for illustration purposes only and are not to be regarded as absolute operating values. Actual operating values will depend on the specification and configuration of the incinerator unit and other operating parameters.

In the use of the invention as described, either for disposal or energy recovery purposes, steady state operating conditions can be achieved regardless of the density, moisture content or heat value of the waste refuse fed into the waste disposal incinerator or the energy recovery system.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. An apparatus for burning waste refuse having a heterogeneous composition comprising:
    means defining a combustion chamber having an inlet for charging waste refuse therein and an outlet for discharging combustion gases therefrom,
    means disposed within said combustion chamber for agitating waste refuse charged therein,
    means for sensing the temperature differential of combustion gases emanating from burning waste refuse disposed on said agitating means, between spaced points along the path of flow of said emanating combustion gases, and
    means responsive to variations of said sensed temperature differential relative to a preselected temperature differential for adjusting the operation of said agitating means.

2. An apparatus according to claim 1 wherein said temperature differential sensing means includes first means for sensing temperature at a point subjected to radiant and convective thermal energy, and second means for sensing temperature at a point subjected to substantially convective thermal energy.

3. An apparatus according to claim 2 wherein said temperature sensing means comprise thermocouples.

4. An apparatus according to claim 1 wherein said temperature differential sensing means includes first temperature sensing means disposed in said combustion chamber and second temperature sensing means disposed in said combustion chamber outlet.

5. An apparatus according to claim 4 wherein said temperature sensing means comprise thermocouples.

6. An apparatus according to claim 1 including
    means for sensing energy recovery output, and
    means responsive to variations of said sensed energy recovery output relative to a preselected energy recovery output for adjusting a higher temperature of said predetermined temperature differential.

7. An apparatus according to claim 1 including
    means for sensing energy recovery output, and
    means responsive to variations of sensed energy recovery output relative to a preselected energy recovery output for adjusting said preselected temperature differential.

8. An apparatus according to claim 1 including
means for sensing energy recovery output, and
means responsive to variations of said sensed energy recovery output relative to a preselected energy recovery output for adjusting a higher temperature of said predetermined temperature differential and said preselected temperature differential.

9. An apparatus according to claim 1 including
means for supplying air to said combustion chamber,
means for sensing the oxygen content of combustion gases emanating from said combustion chamber, and
means responsive to variations of sensed oxygen content relative to a preselected oxygen content for adjusting said air supplying means.

10. An apparatus according to claim 1 including
means for supplying overfire and underfire air to said agitating means,
means for sensing the temperature of said combustion chamber, and
means responsive to variations of sensed combustion chamber temperatures relative to a preselected combustion chamber temperature for adjusting said overfire and underfire supplying means to alter the rate of overfire and underfire air supplied to said agitating means.

11. An apparatus according to claim 9 wherein said oxygen content sensing means includes an oxygen sensor disposed downstream of said combustion chamber outlet.

12. An apparatus according to claim 9 wherein said air supplying means includes a variable output blower.

13. An apparatus according to claim 10 wherein said overfire and underfire air supplying means includes a flow proportioning valve.

14. An apparatus according to claim 1 wherein said waste refuse agitating means comprises a stoker.

15. An apparatus according to claim 14 wherein said stoker includes an upper section of reciprocable grates adapted to receive raw waste refuse through said combustion chamber inlet, an intermediate section of reciprocable grates adapted to receive dried waste refuse from said upper grate section, and a lower section of reciprocable grates adapted to receive burned refuse from said intermediate grate section, and said means for adjusting the operation of said agitating means includes means for adjusting the speed of reciprocation of the grates of said grate sections.

16. An apparatus according to claim 15 wherein said temperature differential sensing means includes first means for sensing temperature at a point subjected to radiant and convective thermal energy, and second means for sensing temperature at a second point subjected to substantially convective thermal energy.

17. An apparatus according to claim 15 wherein said temperature differential sensing means includes first temperature sensing means disposed in said combustion chamber and second temperature sensing means disposed in said combustion chamber outlet.

18. An apparatus according to claim 15 including
means for sensing energy recovery output, and
means responsive to variations of said sensed energy recovery output relative to a preselected energy recovery output for adjusting a higher temperature of said preselected temperature differential.

19. An apparatus according to claim 15 including
means for sensing energy recovery output, and
means responsive to variations of sensed energy recovery output relative to a preselected energy recovery output for adjusting said preselected temperature differential.

20. An apparatus according to claim 15 including
means for sensing energy recovery output, and
means responsive to variations of said sensed energy recovery output relative to a preselected energy recovery output for adjusting the speed of reciprocation of the grates of said upper grate section.

21. An apparatus according to claim 15 including
means for sensing energy recovery output, and
means responsive to variations of said sensed energy recovery output relative to a preselected energy recovery output for adjusting a higher temperature of said preselected temperature differential, said preselected temperature differential, and the speed of reciprocation of the grates of said upper grate section.

22. An apparatus according to claim 15 including
means for supplying air to said combustion chamber,
means for sensing the oxygen content of combustion gases emanating from said combustion chamber, and
means responsive to variations of sensed oxygen content relative to a preselected oxygen content for adjusting said air supplying means.

23. An apparatus according to claim 15 including
means for supplying overfire and underfire air to said intermediate grate section of said stoker,
means for sensing the temperature of said combustion chamber, and
means responsive to variations of sensed combustion chamber temperatures relative to a preselected combustion chamber temperature for adjusting said overfire and underfire supplying means to alter the rate of overfire and underfire air supplied to said intermediate grate section of said stoker.

24. An apparatus according to claim 22 wherein said oxygen content sensing means includes an oxygen sensor disposed downstream of said combustion chamber outlet.

25. An apparatus according to claim 22 wherein said air supplying means includes a variable output blower.

26. An apparatus according to claim 23 wherein said overfire and underfire air supply means includes a flow proportioning valve.

27. An apparatus according to claim 1 including a steam generating boiler disposed in heat exchange relation with said combustion gases emanating from said combustion chamber.

28. An apparatus according to claim 27 wherein said temperature differential sensing means includes a first temperature sensing means disposed at a point subjected to radiant and convective thermal energy, and second temperature sensing means disposed at a point subjected to substantially convective thermal energy.

29. An apparatus according to claim 28 wherein said first temperature sensing means is disposed in said combustion chamber and said second temperature sensing means is disposed in an inlet of said boiler.

30. An apparatus according to claim 27 including
means for sensing the steam outflow rate of said boiler, and
means responsive to variations of said sensed steam outflow rate relative to a preselected steam outflow rate for adjusting a higher temperature of said preselected temperature differential.

31. An apparatus according to claim 27 including
means for sensing the steam outflow rate of said boiler, and
means responsive to variations of said sensed steamed outflow rate relative to a preselected steam outflow rate for adjusting said preselected steam outflow rate.

32. An apparatus according to claim 27 including
means for sensing the steam outflow rate of said boiler, and
means responsive to variations of said sensed steam outflow rate relative to a preselected steam outflow rate for adjusting a higher temperature of said preselected temperature differential and said preselected temperature differential.

33. An apparatus according to claim 27 including
means for supplying air to said combustion chamber,
means for sensing the oxygen content of combustion gases emanating from said combustion chamber, and
means responsive to variations of sensed oxygen content relative to a preselected oxygen content for adjusting said air supplying means.

34. An apparatus according to claim 27 including
means for supplying overfire and underfire air to said agitating means,
means for sensing the temperature of said combustion chamber, and
means responsive to variations of sensed combustion chamber temperature relative to a preselected combustion chamber temperature for adjusting said overfire and underfire supplying means to alter the ratio of overfire and underfire air supplied to said agitating means.

35. An apparatus according to claim 27 wherein said waste refuse agitating means comprises a stoker.

36. An apparatus according to claim 35 wherein said stoker includes an upper section of reciprocable grates adapted to receive raw waste refuse through said combustion chamber inlet, an intermediate section of reciprocable grates adapted to receive dried waste refuse from said upper grate section, and a lower section of reciprocable grates adapted to receive burned refuse from said intermediate grate section, and said means for adjusting the operation of said agitating means includes means for adjusting the speed of reciprocation of selected ones of said grate sections.

37. An apparatus according to claim 36 wherein said temperature differential sensing means includes first means for sensing temperature at a point subjected to radiant and convective thermal energy, and second means for sensing temperature at a second point subjected to substantially convective thermal energy.

38. An apparatus according to claim 36 wherein said temperature differential sensing means includes first temperature sensing means disposed in said combustion chamber and second temperature sensing means disposed in an inlet of said boiler.

39. An apparatus according to claim 36 including
means for sensing the steam outflow rate of said boiler, and
means responsive to variations of said sensed steam outflow rate relative to a preselected steam outflow rate for adjusting a higher temperature of said preselected temperature differential.

40. An apparatus according to claim 36 including
means for sensing the steam outflow rate of said boiler, and
means responsive to variations of said sensed steam outflow rate relative to a preselected energy recovery output for adjusting said preselected temperature differential.

41. An apparatus according to claim 36 including
means for sensing the steam outflow rate of said boiler, and
means responsive to variations of said sensed steam outflow rate relative to a preselected steam outflow rate for adjusting the speed of reciprocation of the grates of said upper grate section.

42. An apparatus according to claim 36 including
means for sensing the steam outflow rate of said boiler, and
means responsive to variations of said sensed steam outflow rate relative to a preselected steam outflow rate for adjusting a higher temperature of said preselected temperature differential, said preselected temperature differential, and the speed of reciprocation of the grates of said upper section.

43. An apparatus according to claim 36 including
means for supplying overfire and underfire air to said intermediate grate section of said stoker,
means for sensing the temperature of said combustion chamber, and
means responsive to variations of sensed combustion chamber temperature relative to a preselected combustion chamber temperature for adjusting said overfire and underfire supply means to alter the ratio of overfire and underfire air supplied to said intermediate grate section of said stoker.

44. A method of controlling the operation of an apparatus for burning raw waste refuse having a heterogeneous composition, including a combustion chamber having an inlet for charging refuse therein and an outlet for discharging combustion gases therefrom, and means disposed within the combustion chamber for receiving refuse to be burned thereon from said combustion chamber inlet comprising:
sensing the temperature differential of combustion gases emanating from burning waste refuse disposed on said agitating means, between spaced points along the path of flow of said combustion gases, and
adjusting said agitating means responsive to variations of said sensed temperature differential relative to a preselected temperature differential.

45. A method according to claim 44 including
sensing said temperature differential between a first point subjected to radiant and convective thermal energy and a second point subjected to substantially convective thermal energy.

46. A method according to claim 44 in which combustion and combustion outlet temperatures are sensed.

47. A method according to claim 44 including
sensing the energy recovery output of the apparatus, and
adjusting said preselected temperature differential responsive to variations of sensed energy recovery output relative to a preselected energy recovery output.

48. A method according to claim 44 including
sensing the energy recovery output of the apparatus, and
adjusting a higher temperature of said preselected temperature differential responsive to variation of sensed energy recovery output relative to a preselected energy recovery output.

49. A method according to claim 44 including
sensing the oxygen content of combusting gases emanating from said combustion chamber, and
adjusting the supply of air to said combustion chamber responsive to variations of sensed oxygen content relative to a preselected oxygen content.

50. A method according to claim 44 including
sensing combustion chamber temperatures and
adjusting the ratio of overfire and underfire air supplied to said combustion chamber responsive to variations of said sensed combustion chamber temperature and a preselected combustion chamber temperature.

51. A method of controlling the operation of an apparatus for burning raw waste refuse having a heterogeneous composition, including a combustion chamber having an inlet for charging refuse therein and an outlet for discharging combustion gases therefrom, and a stoker disposed within said combustion chamber for receiving refuse to be burned from said combustion chamber inlet, having an upper section of reciprocable grates, an intermediate section of reciprocable grates and a lower section of reciprocable grates, comprising
sensing the temperature differential of combustion gases emanating from burning waste refuse disposed on said stoker, between spaced points along the path of flow of said combustion gases, and
adjusting the speed of reciprocation of the intermediate section of said stoker responsive to variations of said sensed temperature differential relative to a preselected temperature differential.

52. A method according to claim 51 including
sensing said temperature differential between a first point subjected to radiant and convective thermal energy and a second point subjected to substantially convective thermal energy.

53. A method according to claim 51 in which combustion chamber and combustion chamber outlet temperatures are sensed.

54. A method according to claim 51 including
sensing the energy recovery output of the apparatus, and
adjusting said preselected temperature differential responsive to variations of sensed energy recovery output relative to a preselected energy recovery output.

55. A method according to claim 51 including
sensing the energy recovery output of the apparatus, and
adjusting a higher temperature of said preselected temperature differential responsive to variations of sensed energy recovery output relative to a preselected energy recovery output.

56. A method according to claim 51 including
sensing the oxygen content of combustion gases emanating from said combustion chamber, and
adjusting the supply of air to said combustion chamber responsive to variations of sensed oxygen content relative to a preselected oxygen content.

57. A method according to claim 51 including
sensing combustion chamber temperature, and
adjusting the ratio of overfire and underfire air supplied to the intermediate section of said stoker responsive to variations of said sensed combustion chamber temperature and a preselected combustion chamber temperature.

58. A method according to claim 51 including
sensing the energy recovery output of the apparatus, and
adjusting the speed of reciprocation of the grates of said upper section of said stoker responsive to variations of said second energy recovery output relative to a preselected energy recovery output.

59. A method of controlling the operation of an energy recovery system utilizing raw waste refuse having a heterogeneous composition as a fuel and including a combustion chamber having an inlet for charging refuse therein and an outlet for discharging combustion gases therefrom, a stoker disposed within said combustion chamber for receiving refuse to be burned from said combustion chamber inlet having an upper section of reciprocable grates, an intermediate section of reciprocable grates and a lower section of reciprocable grates, and a steam generating boiler disposed in heat exchange relation to combustion gases emanating from said combustion chamber comprising
sensing the temperature differential of combustion gases emanating from burning waste refuse disposed on said stoker, between spaced points along the path of flow of said combustion gases, and
adjusting the speed of reciprocation of the intermediate section of said stoker responsive to variations of said sensed temperature differential relative to a preselected temperature differential.

60. A method according to claim 59 including
sensing said temperature differential between a first point subject to radiant and convective thermal energy and a second point subject to substantially convective thermal energy.

61. A method according to claim 59 in which combustion chamber and combustion chamber outlet temperatures are sensed.

62. A method according to claim 59 including
sensing the steam outflow rate of the boiler, and
adjusting said preselected temperature differential responsive to variations of sensed steam outflow rates relative to a preselected steam outflow rate.

63. A method according to claim 59 including
sensing the steam outflow rate of said boiler, and
adjusting a higher temperature of said preselected temperature differential responsive to variations of sensed steam outflow rates relative to a preselected steam outflow rate.

64. A method according to claim 59 including
sensing the steam outflow rate of said boiler, and
adjusting the speed of reciprocation of the upper section of said stoker responsive to variations of sensed steam outflow rates relative to a preselected steam outflow rate.

65. A method according to claim 59 including
sensing the steam outflow rate of said boiler, and
adjusting the speed of reciprocation of the upper section of said stoker, said preselected temperature differential and a higher temperature of said preselected temperature differential responsive to variations of sensed steam outflow rates relative to said preselected steam outflow rate.

66. A method according to claim 65 in which the adjustments are made in the sequence of adjusting the higher temperature of the predetermined temperature differential, adjusting the predetermined temperature differential and adjusting the speed of reciprocation of the grate in the upper section of the stoker.

67. A method according to claim 59 including sensing the oxygen content of combustion gases emanating from said combustion chamber, and adjusting the supply of air to said combustion chamber responsive to variations of sensed oxygen content relative to a preselected oxygen content.

68. A method according to claim 59 including
sensing combustion chamber temperature, and
adjusting the ratio of overfire and underfire supplied to the intermediate section of said stoker responsive to variations of said sensed combustion chamber temperature and a preselected combustion chamber temperature.

69. A method according to claim 44 including
sensing the energy recovery output of the apparatus,
determining whether the sensed energy recovery output is at a preselected energy recovery output,
determining whether the sensed energy recovery output is approaching the preselected energy recovery output, and
adjusting a higher temperature of the preselected temperature differential responsive to the sensed energy recovery output approaching the preselected energy recovery output.

70. A method according to claim 69 including
adjusting the higher temperature of the preselected temperature differential, the preselected temperature differential and the input of refuse fed into the combustion chamber responsive to the sensed energy recovery output not approaching the preselected energy recovery output.

71. A method according to claim 70 in which the adjustments are made in the sequence of adjusting the higher temperature of the preselected temperature differential,
adjusting the preselected temperature differential and adjusting the feed input.

72. An apparatus according to claim 1 including
means for sensing the energy recovery output of the apparatus,
means for determining whether the sensed energy recovery output is at a preselected energy output,
means for determining whether the sensed energy recovery output is approaching the preselected energy recovery output, and
adjusting a higher temperature of the preselected temperature differential responsive to the sensed energy recovery output approaching the preselected energy recovery output.

73. An apparatus according to claim 72 including
means for adjusting the higher temperature of the preselected temperature differential, the preselected temperature differential and the input of refuse fed into the combustion chamber responsive to the sensed energy recovery output not approaching the preselected energy recovery output.

74. An apparatus according to claim 73 wherein said adjusting means is operable to make adjustments in the sequence of adjusting the higher temperature of the selected temperature differential, adjusting the preselected temperature differential and adjusting the feed rate.

* * * * *